June 22, 1965 J. J. HEYDON ETAL 3,190,784

MEANS AND TECHNIQUES FOR UNITIZING

Filed Oct. 24, 1960 9 Sheets-Sheet 1

INVENTORS
JOHN J. HEYDON
OHMER V. CLAWSON

BY Lyon & Lyon

ATTORNEYS

INVENTORS
JOHN J. HEYDON
OHMER V. CLAWSON

BY Lyon & Lyon
ATTORNEYS

INVENTORS
JOHN J. HEYDON
OHMER V. CLAWSON

BY

ATTORNEYS

INVENTORS
JOHN J. HEYDON
OHMER V. CLAWSON

BY Lyon & Lyon
ATTORNEYS

INVENTORS
JOHN J. HEYDON
OHMER V. CLAWSON
BY Lyon & Lyon
ATTORNEYS

MEANS AND TECHNIQUES FOR UNITIZING

Filed Oct. 24, 1960

INVENTORS
JOHN J. HEYDON
OHMER V. CLAWSON

BY Lyon & Lyon
ATTORNEYS

INVENTORS
JOHN J. HEYDON
OHMER V. CLAWSON
BY Lyon & Lyon
ATTORNEYS

MEANS AND TECHNIQUES FOR UNITIZING

Filed Oct. 24, 1960 9 Sheets-Sheet 8

INVENTORS
JOHN J. HEYDON
OHMER V. CLAWSON

BY Lyon & Lyon
ATTORNEYS

INVENTORS
JOHN J. HEYDON
OHMER V. CLAWSON
BY Lyon & Lyon
ATTORNEYS 3,190,784

MEANS AND TECHNIQUES FOR UNITIZING

John J. Heydon, Fullerton, and Ohmer V. Clawson, Costa Mesa, Calif., assignors, by mesne assignments, to The Scionics Corporation, Canoga Park, Calif., a corporation of California Filed Oct. 24, 1960, Ser. No. 64,482
18 Claims. (Cl. 156—513)

The present invention relates to means and techniques involving improved means for mounting film on a card.

Briefly, the apparatus disclosed herein functions generally to mount a photographic negative film in an apertured portion of a card of the character used in business machines. The sequence of operations is generally as follows. A card is placed in a holder in the machine and an apertured portion is cut in the card. The machine has then fed thereto the photographic negative film as well as material which ultimately maintains a section cut from the film within the boundaries of the card-apertured portion, the result being a card covered on one side thereof with such material with such material maintaining a cut section of film within the boundaries of the card-apertured portion. Bonding of this material to the emulsion side of the film results in protection of the film against moisture and abrasion.

The photographic negative film is supplied from either a spool or in the form of a long strip from which a particular section of film is automatically cut and inserted into the card-apertured portion.

The transparent bonding tape is also supplied from a spool and a rectangular portion thereof is automatically cut therefrom and bonded to the marginal edges of the card-apertured portion and the photographic negative film section after the latter has been automatically positioned within the card apertured portion.

These various operations indicated above are accomplished by a machine embodying important features of the present invention in a simple, expeditious and quick manner using relatively unskilled machine operators and commercially available transparent material and cards.

The present invention has found particular utility in preparing or unitizing file cards containing information relative to real estate transactions. For example, the card, which may be in the form of a so-called calendered IBM card, has information printed thereon as to a particular parcel of real estate. The photographic negative film may be in the form of an 8 mm., 16 mm. or 35 mm. film strip which is a photographic negative of a particular document affecting such parcel such as, for example, a deed of trust, quitclaim deed or the like. The invention, of course, it not limited to this particular use but in general is applicable where different bits of information are desired to be integrated into a single media. For example, the same may be used in assembly of graphic material and data, i.e. documents, drawings, maps, etc. that cannot be reduced to electronic data processing and must be reproduced in their original form.

It is therefore a general object of the present invention to provide a machine for accomplishing the above operations and results indicated above.

A specific object of the present invention is to provide a machine of this character requiring for its operation only relatively unskilled personnel.

Another object of the present invention is to provide a machine of this character which incorporates unique means for aperturing a card, cutting a selected film portion of a photographic positive, cutting the bonding tape which serves to ultimately maintain the cut photographic positive portion in the card apertured portion and bonding the bonding tape to the card and film portion to maintain the film portion in proper registry in said apertured portion.

A specific object of the present invention is to provide a simple, compact and easily operated machine which accomplishes all of the operations indicated in the previous paragraph.

Another specific object of the present invention is to provide a machine of this character featured by the fact that it performs a card-aperturing operation.

Another object of the present invention is to provide a unitized record which is permanent in character and in which the transparent material provides protection of the emulsion on the film against moisture and abrasion while yet allowing photographic, electrostatic or xerographic prints to be reproduced with inrestricted clarity; and also in which the thermal bond insures against adjacent ones of such records sticking together.

While specific reference is made herein to a manual feeding of the film into registry, the same may be accomplished entirely automatically; and also two or more films, instead of only one, may be mounted in different apertured portions in the card.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 13, 14, 15, 16, 17:
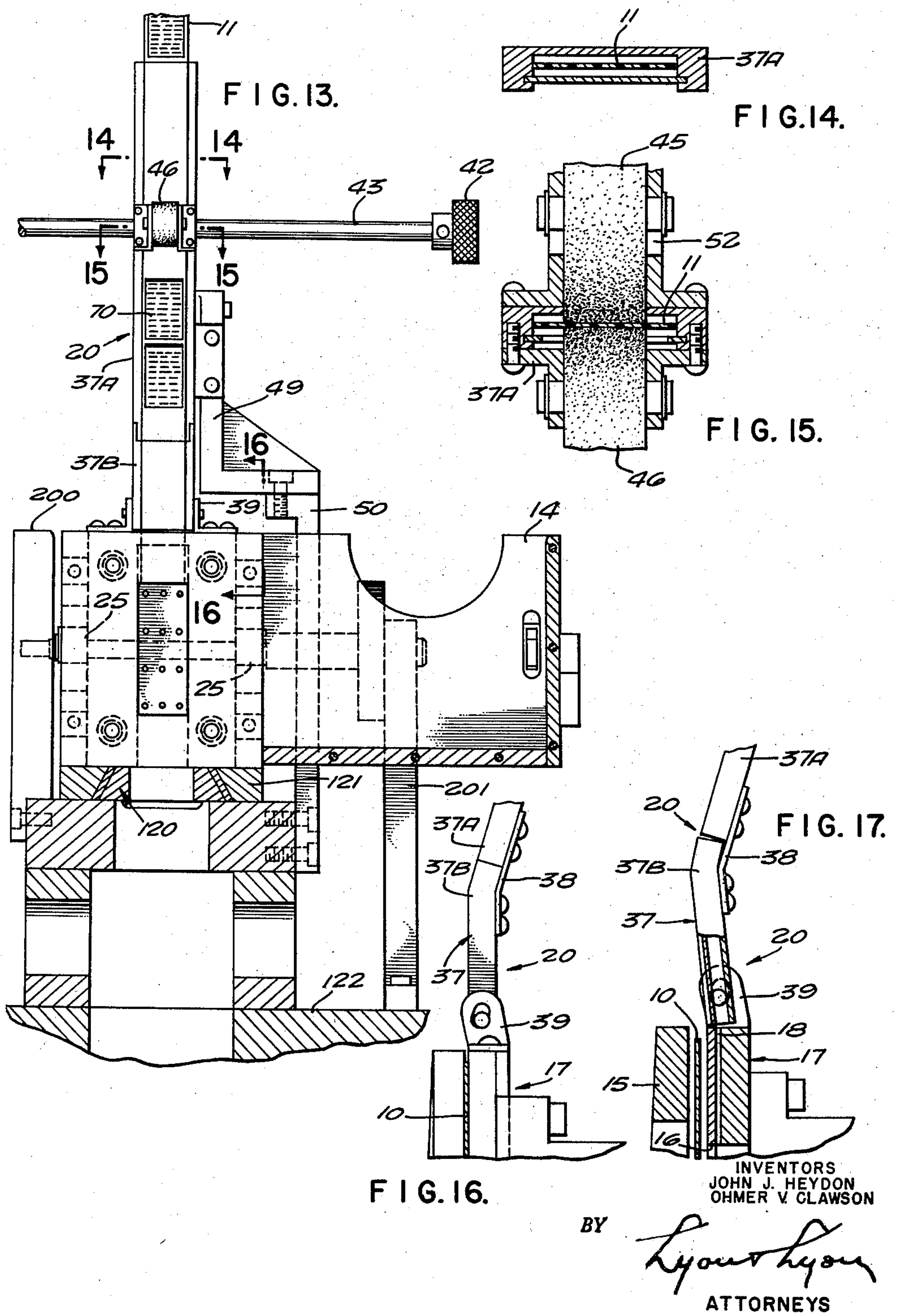
FIGURE 13 is a view taken generally along the line 13—13 in FIGURE 2.

FIGURES 14, 15 and 16 are views taken generally along corresponding lines 14—14, 15—15 and 16—16 in FIGURE 13.

FIGURE 17 is a view similar to FIGURE 16 but illustrates the parts in a different operating position.

Figure 10:
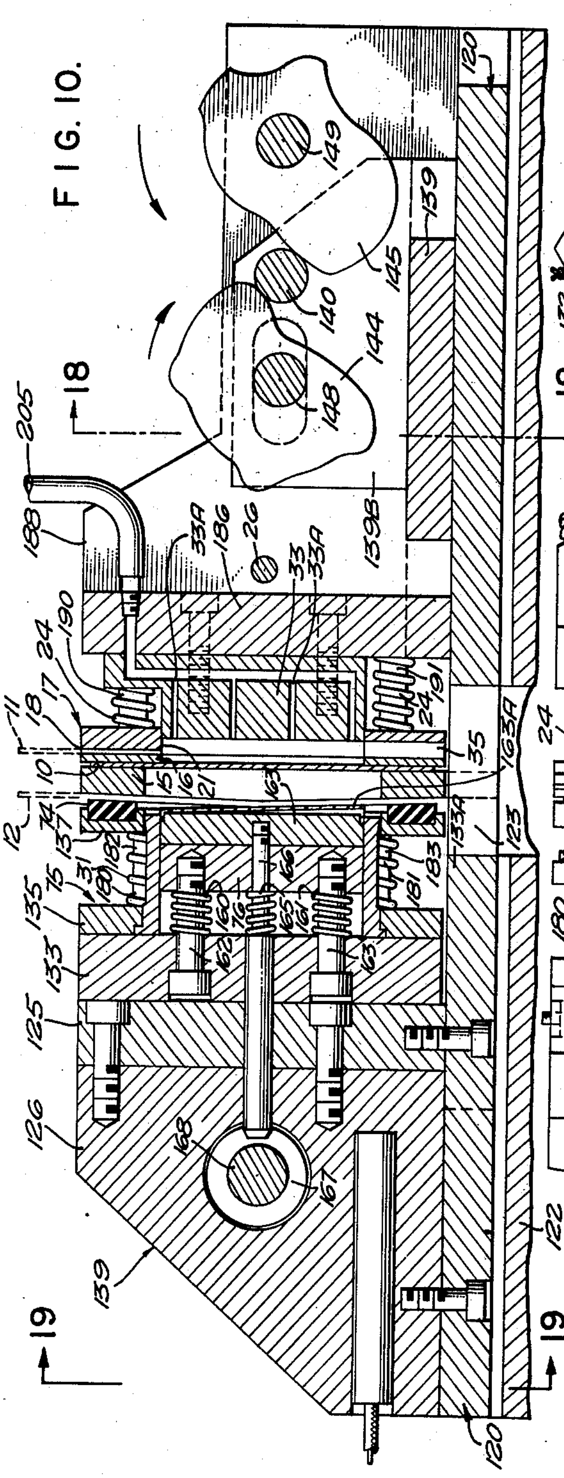
FIGURE 10 is a sectional view taken generally along the line 10—10 in FIGURE 6 but with the card shown clamped to perform the apertured portion in the card.
Figures 18, 19:
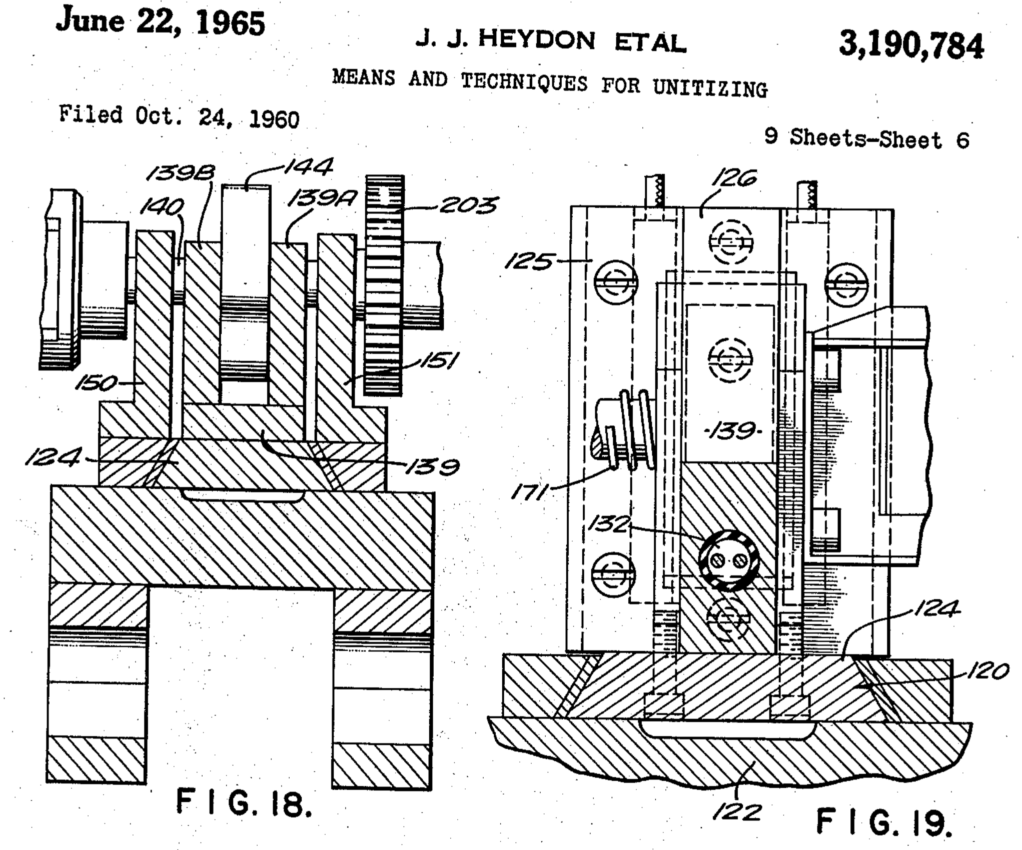

FIGURES 18 and 19 are views taken generally along corresponding lines 18—18 and 19—19 in FIGURE 10.

Figures 2, 3, 4, 5:
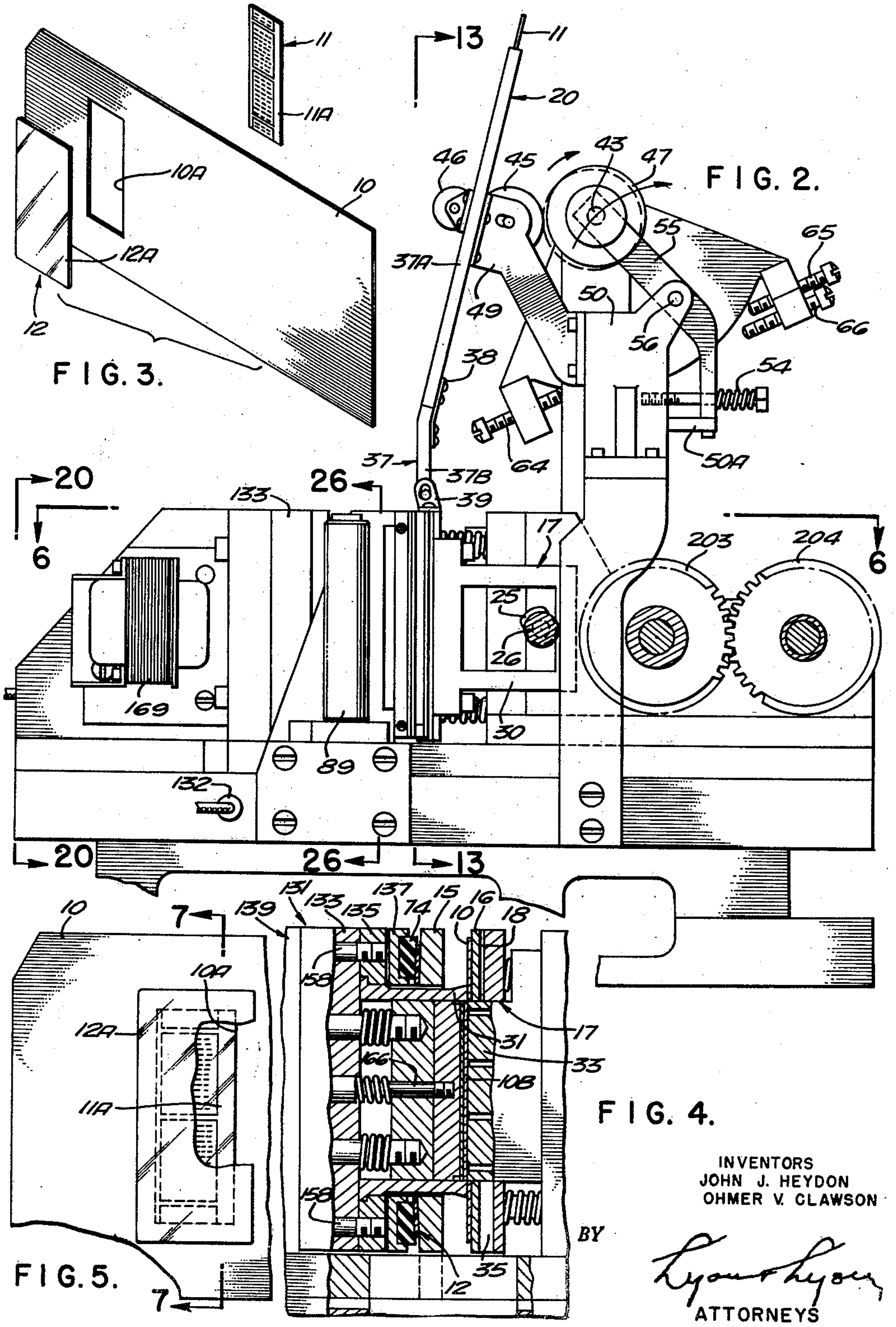
FIGURE 2 is generally a view taken along the line 2—2 in FIGURE 1.
FIGURE 3 is a perspective view illustrating the elements cut and assembled by the machine.
FIGURE 4 is a sectional view similar to the sectional view in FIGURE 10 but with the die member 31 advanced to cut the apertured portion in the card.
FIGURE 5 illustrates a portion of the finished assembly with a portion of the bonding tape broken away.
Figure 20:
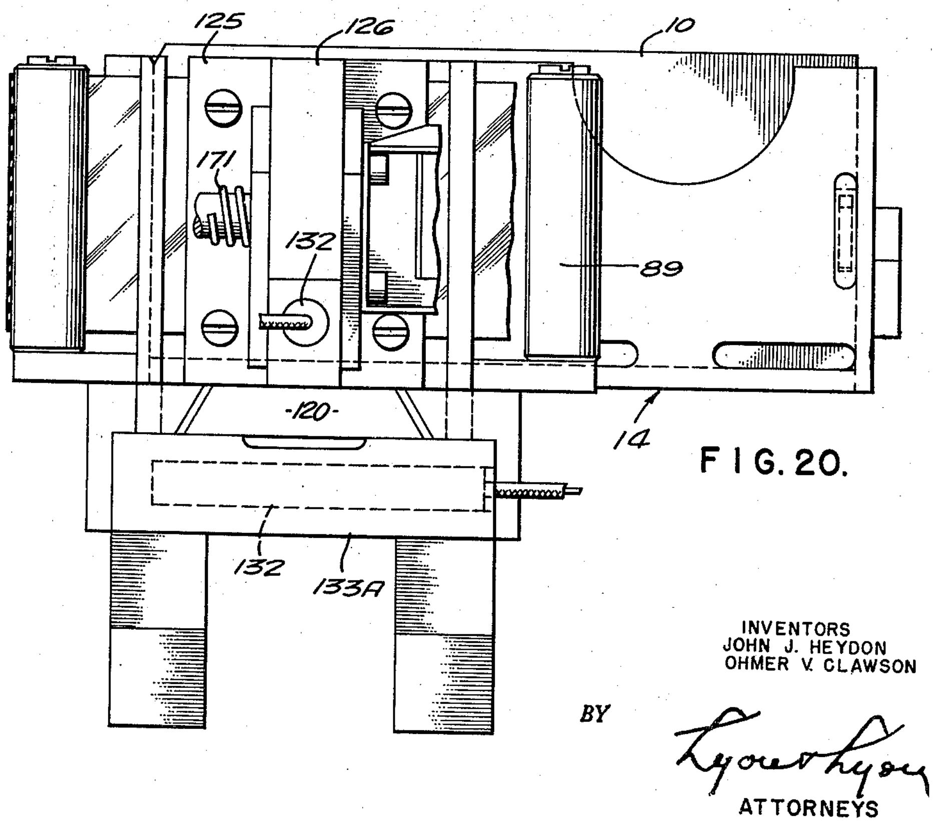

FIGURE 20 is a view taken generally along the line 20—20 in FIGURE 2.

Figures 21, 22, 23:
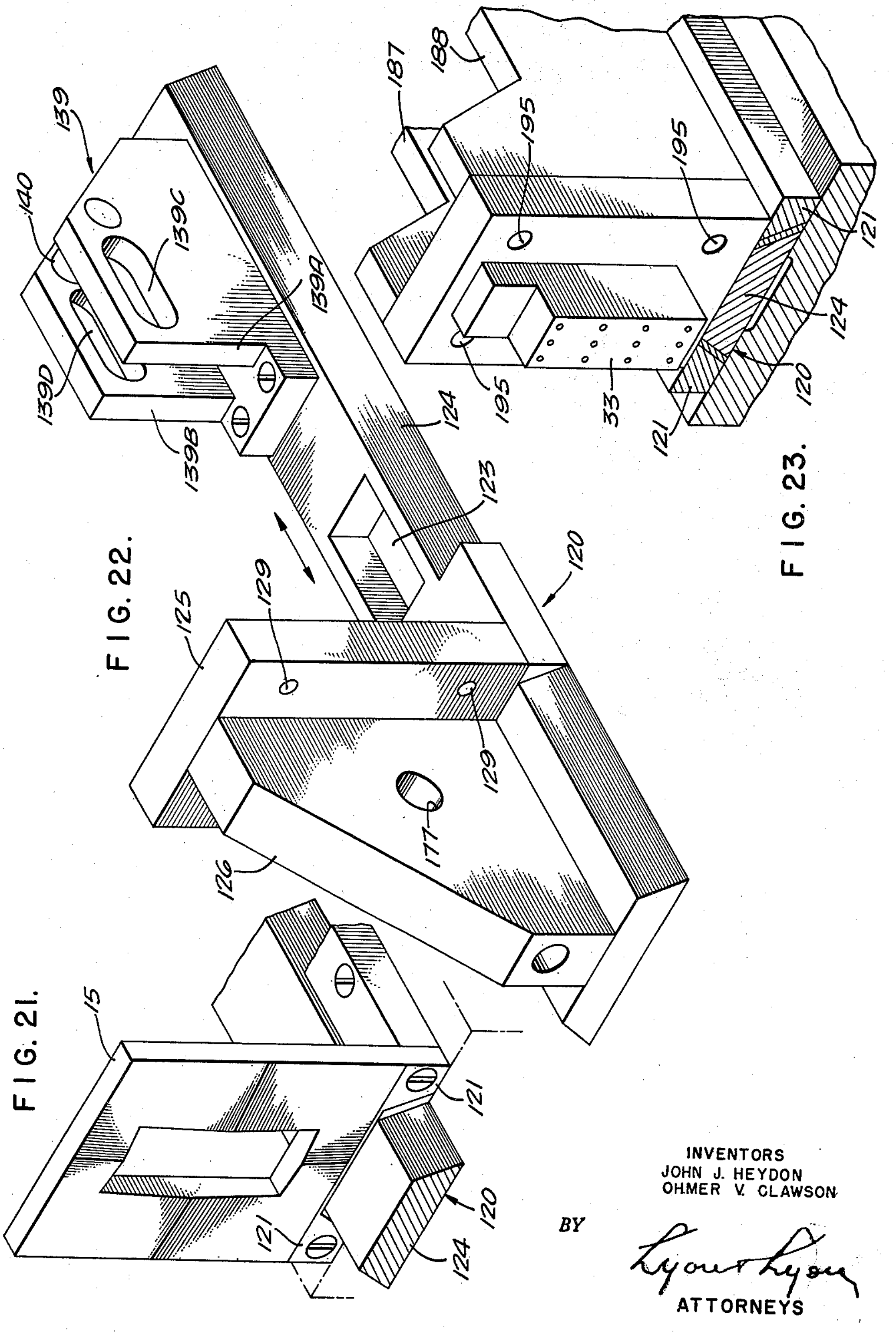

FIGURE 21 is a perspective view illustrating the stationary bonding material cutting die slidably receiving a portion of the structure shown in FIGURE 22.

Figures 11, 12:
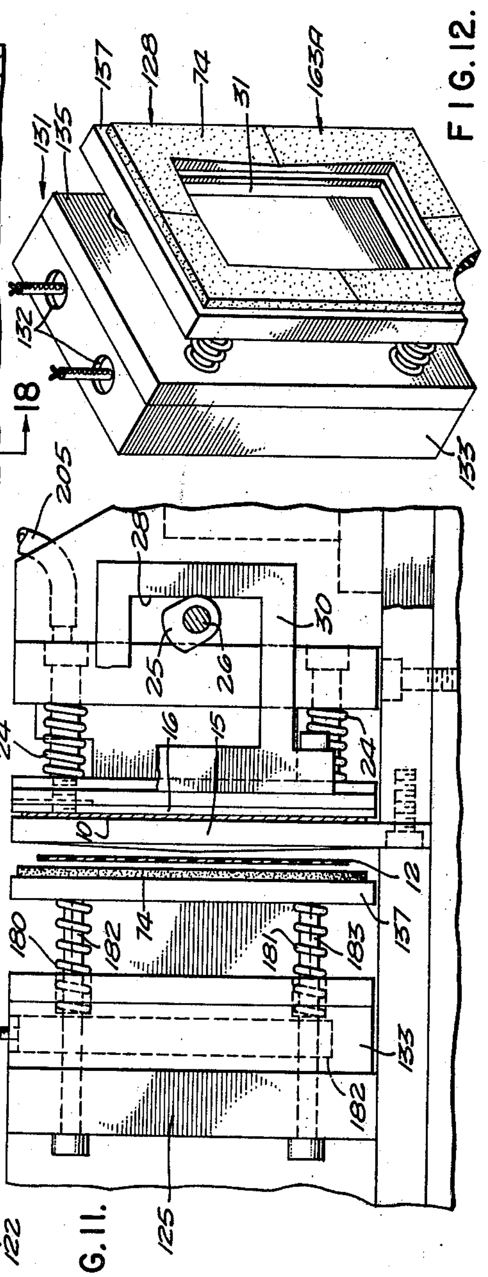
FIGURE 11 is a view similar to that shown in FIGURE 10 but with the parts in a different operating position.
FIGURE 12 is a perspective view illustrating a heater, cutting die and movable block attached to the heater.

FIGURE 22 is a perspective view of the reciprocable member which mounts the assembly shown in FIGURE 12.

FIGURE 23 is a perspective view illustrating details of the stationary vacuum holding member.

Figure 1:
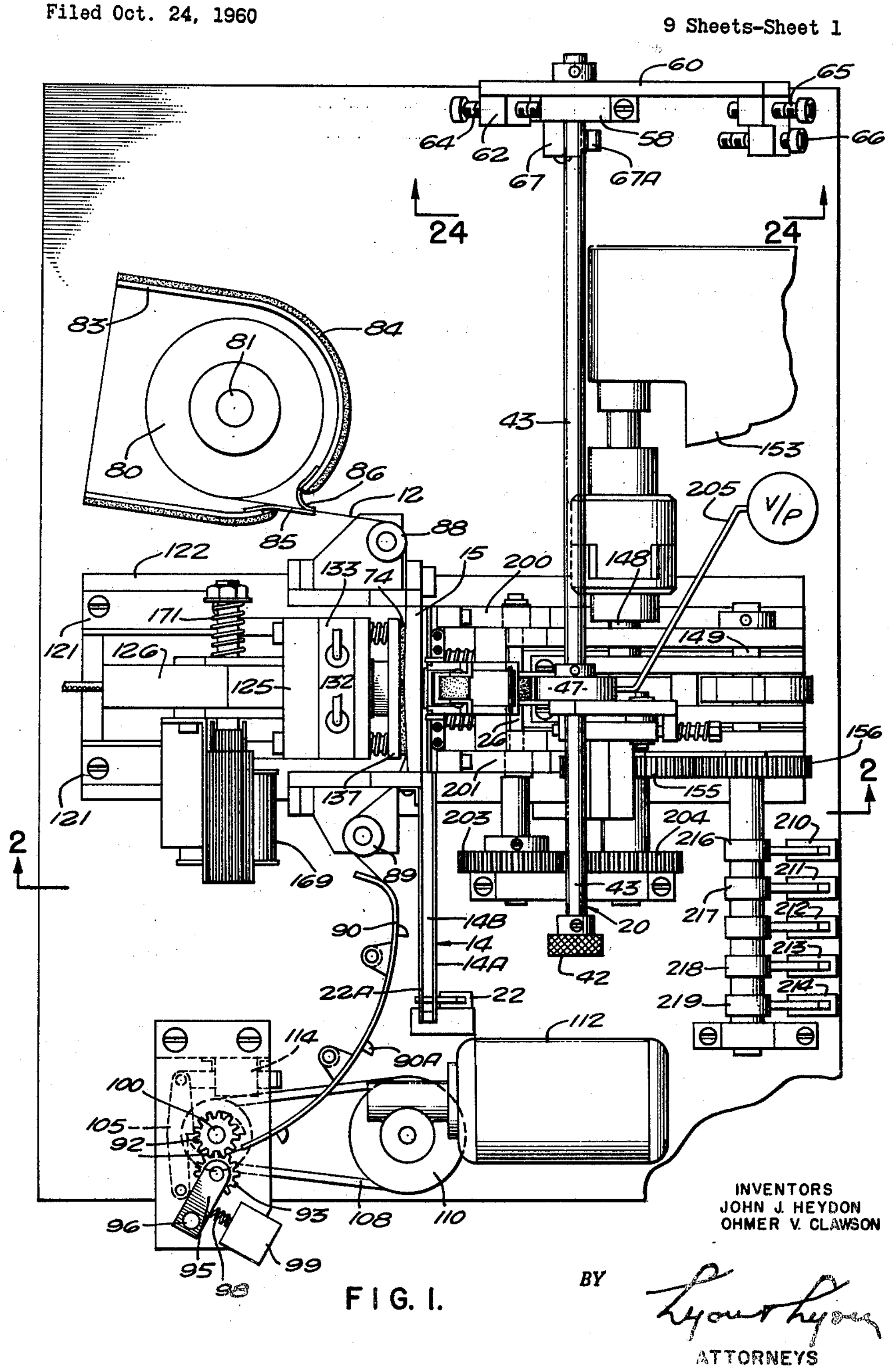
FIGURE 1 is generally a top plan view of a portion of the machine embodying the present invention showing the same at the beginning of the cycle of operations with the machine receptive to receive a card.
Figure 24:
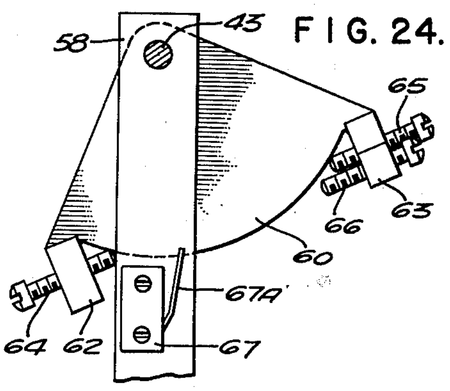

FIGURE 24 is a view taken generally along the line 24—24 in FIGURE 1.

Figure 25:
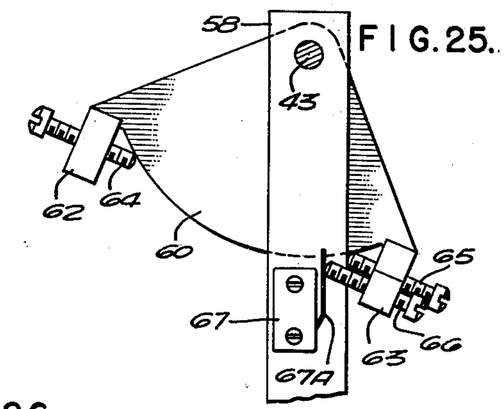

FIGURE 25 shows the elements of FIGURE 24 in a different operating position.

Figure 26:
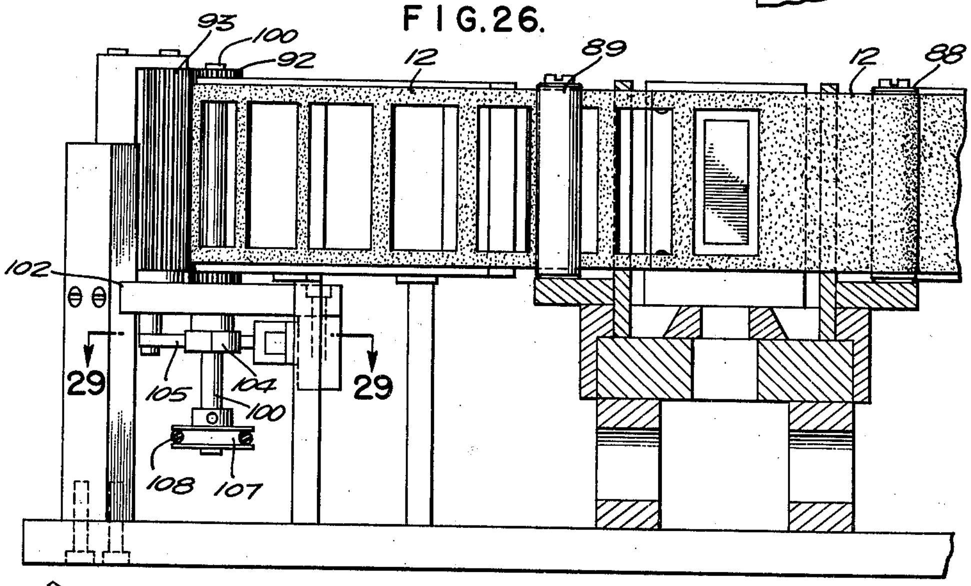

FIGURE 26 is a view taken generally along the line 26—26 in FIGURE 2.

Figure 27:
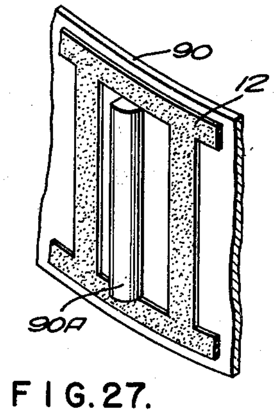

FIGURE 27 is a perspective view illustrating a portion of the bonding material feeding mechanism.

Figure 28:
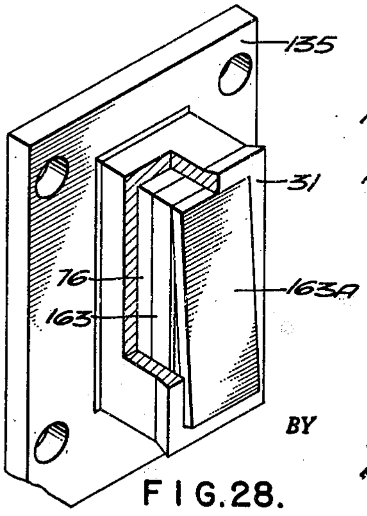

FIGURE 28 is a perspective view illustrating a portion of the die construction.

Figure 29:
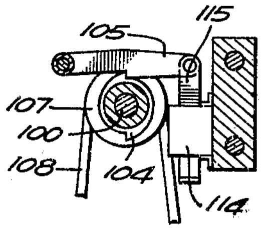

FIGURE 29 is a view taken generally along the line 29—29 in FIGURE 26.

Figures 30, 31, 32:
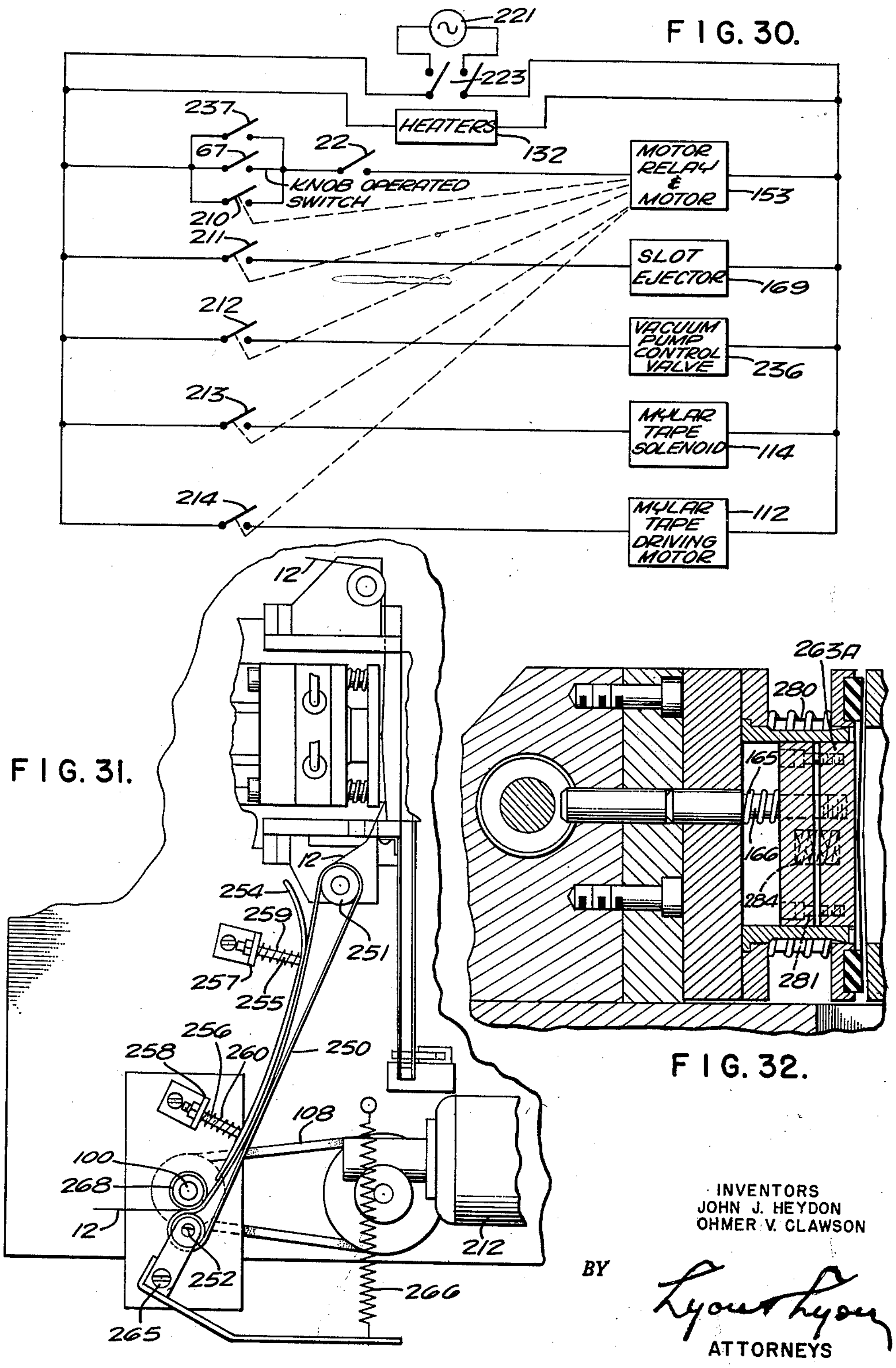

FIGURE 30 shows a typical electrical control circuit for the machine.

FIGURE 31 shows a modified tape-driving mechanism which is substitutable for the corresponding tape-driving mechanism illustrated in the previous figures.

FIGURE 32 shows a modified ejector which is substitutable for the corresponding mechanism in the previous figures.

Referring to the drawings, unapertured cards 10 of the character shown in FIGURE 3 are successively fed into the machine which functions to cut out a rectangular portion thereof to form the rectangular apertured portion or window 10A in the card. Also manually fed into the machine is film from a roll of photographic film 11 and the machine functions to cut off the strip 11A (FIGURE 3) and to accurately position and maintain the same within the confines of the apertured portion 10A. While the cut film strip 11A is being maintained in such apertured portion 10A, the machine operates automatically to feed bonding material 12 from a roll and to cut therefrom the rectangular portion 12A and to bond such portion 12A to the film strip 11A and the surrounding marginal edge of the card apertured portion 10A to produce an assembly illustrated in FIGURES 5, 7 and 8.

*Card-cutting operation*

Figures 6, 7, 8, 9:
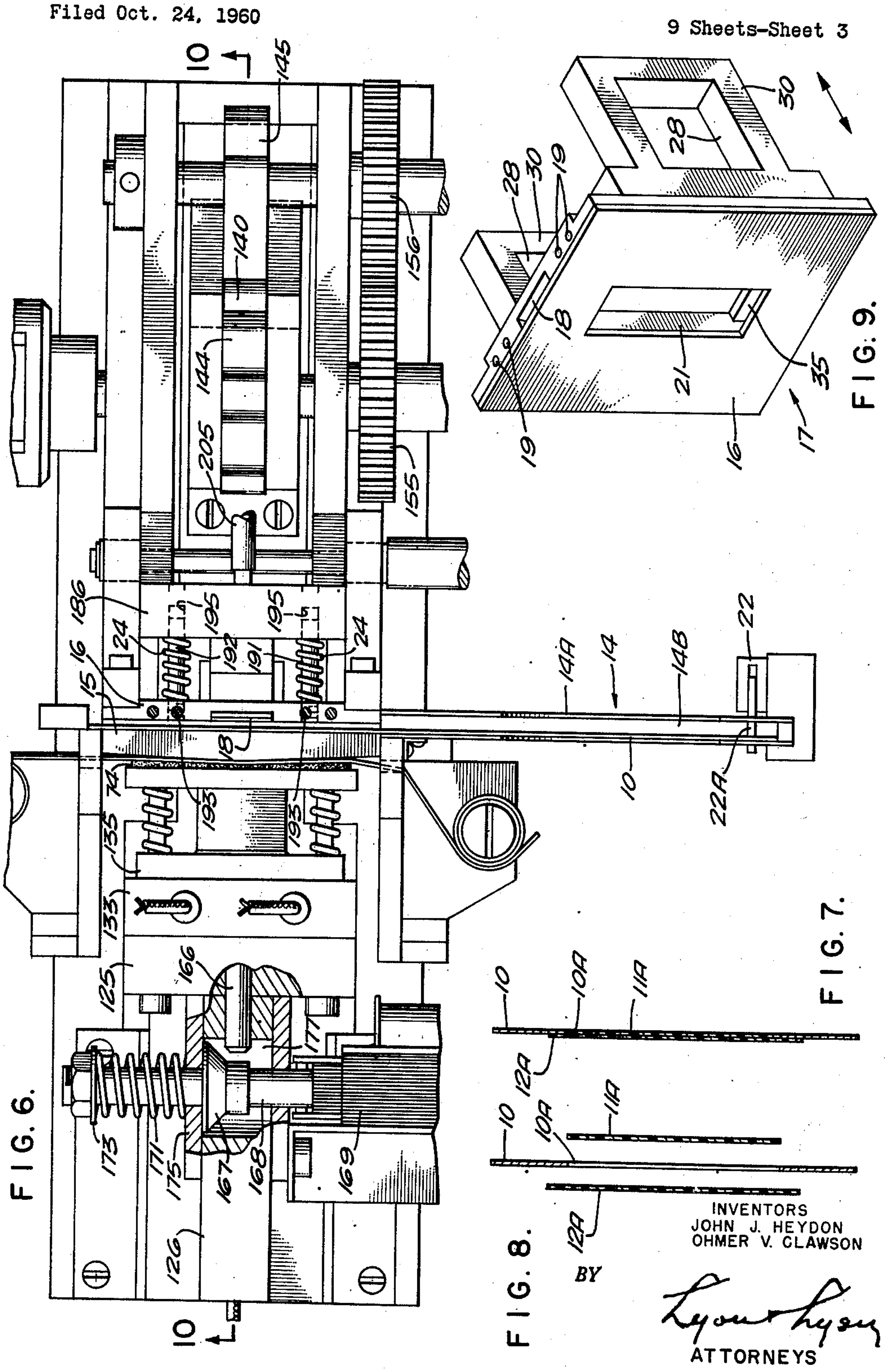
FIGURE 6 is a view taken generally along the line 6—6 in FIGURE 2.
FIGURE 7 is a sectional view taken substantially along the line 7—7 in FIGURE 5.
FIGURE 8 illustrates those elements in FIGURE 7 in disassembled form.
FIGURE 9 is a perspective view illustrating one of the movable elements of the machine.

The card 10 is manually placed in a holder 14 of special construction at the beginning of the cycle of operations when the machine is in the condition illustrated in FIGURES 1, 6 and 17. This holder 14 is of special construction in that it comprises a stationary open-ended rectangular box portion 14A for loosely holding the card in generally an upright position, the other end of the card, i.e. the left hand end, being initially loosely retained between a stationary rectangular-windowed combination clamping plate and die member 15 (FIGURE 17) and a spring-biased, cam-actuated, rectangularly-windowed plate 16, the plate 16 serving also as a die member and, as shown in FIGURE 9, being actually the front face of a spring-biased and cam-actuated specially constructed clamping member which has a film channel 18 extending vertically therethrough and which is provided with tapped holes 19 for supporting a portion of the film-feeding mechanism 20 as shown in FIGURES 16 and 17.

It is noted that the stationary portion 14A of the card holder, as illustrated in FIGURES 1 and 6, mounts a small microswitch 22 having its actuating member 22A projecting into the card slot 14B to sense the presence or absence of a card in the holder. This switch 22 may be connected in an electrical circuit as illustrated in FIGURE 30 which is described later.

After the card 10 has been inserted, the machine is set into operation to cut the rectangular apertured portion 10A therein. The first sequence of operations is illustrated in FIGURE 10 wherein the plate member 16 is now free to move under the influence of the coil-compression springs 24 to press the same against the card 10 to thereby clamp the card between the stationary clamping plate member 15 and the front face of the spring-biased plate 16. The springs 24 are, in this condition shown in FIGURE 10, free to accomplish such clamping action since, as illustrated in FIGURE 11, in this same condition the motor-operated cams 25 on shaft 26 have their lobe portions out of engagement with the rectangular apertured portions 28 in the rearwardly-extending guide members 30 forming a part of the fabricated assembly 17 shown in FIGURE 9.

After the card 10 is thus clamped as illustrated in FIGURE 10, continued operation of the machine results in movement of the rectangularly-shaped shearing die member 31 to the position shown in FIGURE 4 wherein a shearing action is accomplished between inner marginal edges of the die member 31 and cooperating outer edges of the stationary suction plate or suction chuck 33. It will be observed in such movement of the die 31 from its position shown in FIGURE 10 to its position shown in FIGURE 4 that the card 10 continues to remain clamped against the forward plate 16 of the spring-biased assembly 17. In other words, initially the card 10 is clamped as illustrated in FIGURE 10 and the card continues to be clamped when and as the forward flat rectangular face of the die member 31 contacts the card; and further movement of the die 31 serves to compress the springs 24 and to carry the card rearwardly where the shearing action illustrated in FIGURE 4 is accomplished.

After the shearing action illustrated in FIGURE 4, the die 31 is automatically withdrawn to the left, still maintaining, however, the useful part of the card 10 in clamped condition until the card 10 again engages the stationary clamping member 15, at which time the clamping function is transferred to the clamping member 15. During such retracted movement of the die member, the non-useful cut-out portion 10B (FIGURE 4) of the card is allowed to fall through the lower enlarged slot 35 in the movable assembly 17. The machine then automatically comes to rest with the cut card being clamped between the stationary clamping member 15 and the spring-biased front plate 16 to thereafter permit manual feeding of the film 11 into and through the film slot 18, as now presently described.

*Film-feeding mechanism*

After the apertured portion of the card 10 has been cut, the machine is at rest, and the film is manually fed into the machine such that a selected portion accurately registers within the card apertured portion 10A, at which time the machine is automatically again set into operation to cut the selected portion 11A of the film 11 and to subsequently bond such selected cut portion of the film within the card apertured portion 10A.

For these purposes a film-feeding channel 37, comprising two hinged sections 37A, 37B (FIGURE 2), is loosely pivoted on brackets 39 (FIGURES 2 and 17) secured to the spring-biased assembly 17 such that this two-piece film channel, hinged at the flexible connecting strip 38 and pivoted on brackets 39, is always in registry with the film guide 18 in the assembly 17.

The film-feeding mechanism 20 is described in connection with FIGURES 1, 2 and 13, 24 and 25 and includes a manually-operable knurled knob 42 on a shaft 43 for driving the friction rollers 45 and 46 between which the film 11 is clamped as shown in FIGURE 15, the roller 46 being engageable with the friction roller 47 on the manually rotatable shaft 43 as illustrated in FIGURE 2.

The upper film channel member 37A carries the roller 46 and is rigidly secured to an upwardly-extending arm 49 which in turn is rigidly secured to the stationary upstanding bracket member 50. The film roller 45, as shown in FIGURE 15, is rotatably supported on the upper film channel member 37A and the rear friction roller 45 is rotatably supported in the lost motion slot 52 in the rear-extending extension 53 of the film channel member 37A such that the rear roller 46 may be positoned in and out of driving engagement with the film 11 between the two rollers 46, 45. In order to effect such a driving connection, the manually-rotated roller 47, as shown in FIGURE 2, is rotatably supported on an arm 55 having its intermediate portion pivoted on a pin 56 carried by the bracket member 50 and having its lower end in FIGURE 2 spring-biased by coil-compression spring 54 into engagement with the bracket extension 50A. The driving shaft 43 is prolonged and is also journalled for rotation in the stationary bracket 58 (FIGURES 1 and 25), at which point the shaft 43 may also pivot slightly for purposes of moving the manual rotatable roller 47 into engagement with the driving roller 45. The shaft 43 carries an arcuate-shaped plate 60 having threaded extensions 62, 63 into which adjustment screws 64, 65 and 66 are threaded, the arrangement being so weighted that normally the adjustment screw 64 contacts the shaft-supporting bracket 58 which serves also as a stop member. The other limit of travel of the shaft 43 is adjusted by adjusting screw 65 which is also engageable with the same shaft-supporting bracket 58. The other adjustment screw 66 is engageable with the actuating member 67A of switch 67 mounted on the bracket 58. The screws 65 and 66 are so adjusted that at the desired limit of travel the switch 67 is actuated to energize the machine, as described later, to begin the next cycle of operations.

In order to properly index the film frames in the apertured card, the film frames are printed a predetermined equal distance apart and a viewing aperture 70 (FIGURE 13) is provided in the film guide channel member 37A. The film 11 is positioned so that frames of the film are brought into alignment in the viewing aperture 70 and when this is done, the lower end of the film is correctly positioned for cutting and insertion into the apertured card. In order that such registration may be accomplished simply and expeditiously, the adjustment screws 64 and 65 are provided, the adjustment screw 64 being adjusted so as to contact the bracket 58 when film frames are in registry in the film window 70 and the other adjustment screw 65 is adjusted so that a predetermined angular rotation of the shaft 43 and linear movement of the film 11 results to bring the next film section automatically in registry in the film guide window 70, at which time the switch 67 is operated and the machine is again set in motion to cut in succession the bonding tape and film.

*Film and bonding tape cutting operation*

The film 11 and bonding tape 12 are cut in that order during movement of the die member 31 and spring-biased assembly from its position shown in FIGURE 10, the film 11 previously threaded through the guide 18 being sheared between the inner peripheral edge of die plate 16 and the adjacent edges of suction plate or suction chuck 33 and the bonding tape 12 being sheared between the outer peripheral edge of the die member 31 and the inner edge of the stationary clamping member 15. FIGURE 10 is used in describing this operation and it will be understood that at this stage the card 10 is held in its position as shown in FIGURE 10 but the card 10 has previously been apertured as previously described in connection with FIGURE 4.

As a result of the film-feeding operation described in the above heading, a portion of the film 11 is properly indexed with the lowermost portion of the film 11 extending partially into the lower slot 35 of assembly 17. Forward movement of the assembly 75 results in shearing of the film and the sheared portion is retained on the vacuum chuck 33. After this film-shearing operation, the assembly 75 is retracted and the bonding tape is advanced and positioned between the stationary clamping member 15 and the resilient pad 74.

Then, as the assembly 75, including the die member 31 and spring-biased plunger 76 and spring-biased pad 74, is advanced, the pad 74 first contacts the tape 12 to clamp the same against the stationary clamping member 15 and shortly thereafter a rectangular piece is cut out of the tape due to the shearing action between the outer peripheral edge of the die member 31 and the inner edge of the stationary clamping member 15. This cut-out portion of the tape is the useful portion and is advanced to the right in FIGURE 10 by the forward flat surface of the die member 31 and plunger 76 until the same contacts the peripheral edge around the apertured portion in the card, at which time such tape 12 and card 10 are clamped between the die member 31 and the spring-biased assembly 17. Further, continued movement of the die member 31 to the right in FIGURE 10 and spring-biased plunger 76 results in the cut-out portion of the bonding tape being firmly pressed against the cut-out film portion 11A, the marginal edge of the bonding tape being already pressed against the card by the die member. At this stage the die member 31 automatically stops or dwells for a predetermined length of time to allow heat to be supplied to the bonding tape in its pressurized condition to effect a good bond between, on the one hand, the bonding tape, the card and the film on the other hand. Summarizing briefly, in this sequence of events first the film is sheared between the peripheral edge of die plate 16 and the adjacent edge of suction plate or suction chuck 33; then the tape punch retracts; the tape is advanced, then cut by the advancing punch; and then the tape contacts the card and the card and tape move forward to contact the film held on the vacuum chuck.

After such predetermined time interval, the die member 31 and spring-biased plunger 76 are withdrawn to the left to their position illustrated in FIGURE 10 and the cam member 25 on shaft 26 (FIGURES 11 and 2) moves the assembly 17 to the right to unclamp the card 10 to permit removal of the completed assembly.

*Bonding tape feed mechanism*

The mechanism for feeding the bonding tape 12 is described in connection with FIGURES 1, 26, 27, 29 and 6. The bonding tape 12 is supplied from a supply spool 80 loosely mounted on a stationary spindle 81 on the machine. Preferably, because of the heat developed in the machine, the spool is thermally insulated from the heat as, for example, by placing the same in a heat-shielding housing 83 having its outside covered with asbestos 84 where heat may not be readily transferred to the same from the heating elements in the machine. As an additional precautionary measure, the spool 80 is protected from heat by neoprene flaps 85, 86 on housing 83 which provide a seal between which the tape 12 passes. The tape 12 is threaded into the space between the stationary clamping plate 15 and the spring-biased pressure plate 74 and passes over two guide rollers 88, 89 from the latter of which the then perforated tape passes along an arcuate stationary guide member 90 having spaced projections 90A thereon to a pair of toothed rollers 92, 93 between which the perforated tape 12 is clamped for purposes of pulling or advancing the tape predetermined incremental distances.

The roller 93 is rotatably mounted on an arm 95 which is pivoted on the pin 96 and an intermediate portion of such arm is biased by coil-compression spring 98 acting between the arm 95 and a stationary abutment 99 to bias the roller 93 into engagement with the motor-driven roller 92. The roller 92 has its shaft 100 journalled for rotation in the stationary supporting structure 102 and such shaft 100 has mounted thereon a ratchet 104 cooperating with the pivoted pawl 105 which normally serves to prevent rotation of the shaft 100. The shaft 100 also mounts a pulley 107, the pulley being driven by a belt 108 which passes over the motor-driven pulley 110. This latter pulley 110 is driven by the motor 112 through suitable reduction gears incorporated in the motor. The tape 12 is thus advanced a predetermined distance by momentarily energizing the solenoid 114 to withdraw the pawl 105, link-connected to armature 115, out of its engagement with the ratchet 104. After a half revolution of the ratchet 104, the pawl 105 again engages the ratchet to arrest movement of the tape 12 and shortly thereafter or contemporaneously therewith, the motor 112 may be energized as described later in connection with FIGURE 30.

*Movable die-carrying carriage*

The die member 31 for aperturing the card and for cutting useful rectangular portions out of the bonding tape 12 is fixedly mounted on a reciprocable carriage 120. A portion of this carriage is illustrated in FIGURE 22 and it will be observed therein that because of the precision required in the cutting operations, the base of the carriage is of heavy stock material shaped to accurately slide in stationary ways 121 as illustrated in FIGURES 21 and 23. These ways 121 are affixed to a supporting base 122 comprising frame members suitably secured together. The base plate 124 of the carriage is apertured at 123 to permit non-useful portions of the card and film to drop out of the machine.

The base plate 124 has secured thereto a heavy metal slab 125 backed by a generally triangularly shaped block 126 which is also secured to the base. The assembly 128 shown in FIGURE 12 is secured to the block 125 in FIGURE 22, the apertured holes 129 in the block being provided for that purpose. This assembly 128 shown in FIGURE 12 includes a heat source 131 in the form of electrical heaters 132 within the metal block 133, an apertured die-mounting plate 135, cutting die 31, the spring-biased rubber-faced pressure plate 137 with the rubber facing 74 for clamping the bonding tape during the time it is being cut, and a spring-biased plunger or block 76 which is rectangular and which is slidable within the rectangular die member 31.

Also mounted on the base plate 124 in FIGURE 22 is a heavy metal support 139 for the shaft 140 having its opposite ends firmly fixed in the upstanding leg portions 139A, 139B of the block 139. These leg portions 139A, 139B are formed with elongated aligned clearance openings for purposes described later. This shaft 140, as shown in FIGURE 10, is engageable by two motor-driven cams 144, 145, the cam 144 being effective to move the carriage 139 (FIGURES 10 and 22) to the right in FIGURE 10 while the other cam 145, rotating in opposite direction, is effective to move the carriage to the left in FIGURE 10. The shafts 148 and 149 mounting the cams 144 and 145 are journalled for rotation in a pair of stationary supports 150, 151 (FIGURE 18), the shaft 148 being coupled to the output shaft of the main driving motor 153 (FIGURES 1 and 18), the motor 153 containing suitable speed reduction gearing. The other cam shaft 149, as illustrated in FIGURE 1, is geared to the motor-driven shaft 148 through the two gears 155 and 156. It will be observed that this shaft 148 passes through the clearance slots 139C, 139D of the shaft-supporting members 139A and 139B (FIGURE 22).

The die member 31 is actually secured to the carriage 139 using the construction shown in FIGURES 4 and 10. The die member 31 is retained by the shouldered apertured plate 135 which is secured to the heater body 133 by bolts 158 and in turn the heater body 133 is secured to the carriage plate 125 using the mounting holes 129 (FIGURE 22).

As shown in FIGURE 10, the rectangularly-shaped plunger 76, which is slidably mounted in the die member 31, is biased by coil-compression springs 160 and 161 on bolts 162 and 163, the bolts 162, 163 being threaded in the plunger 76 and the heads of these bolts being movable in the suitably recessed portion of the heater body 133.

As also shown in FIGURE 10, an ejector plate 163, having pivoted thereon a resilient strip 163A of sheet stock and being rectangular in shape and also slidably mounted in the die member 31, is biased by a coil-compression spring 165 on a threaded ejector pin 166, the pin 166 being threaded in the ejector plate 163 and the spring 165 having one of its ends seated against the plunger 76 and the other one of its ends seated against a shouldered portion of the ejector pin 166.

The lefthand end of the ejector pin 166 in FIGURE 10 is engageable by a conical-shaped cam member 167 on a shaft 168 operated by the solenoid 169 (FIGURE 6) so as to cause independent movement of the ejector plate 163 when the solenoid 169 is operated. For this purpose the cam member 167 is normally biased out of engagement with the actuating pin 166 by a coil-compression spring 171 having one of its ends bearing against the washer 173 on shaft 168 and the other one of its ends bearing against a stationary plate 175 mounted on the carriage block 126. It is noted that this opening 177 within which the cam member 167 is movable corresponds to the opening 177 shown in FIGURE 22.

The rubber-faced tape pressure plate 137 is also spring-biased on the carriage 139 using the construction shown in FIGURE 11 wherein coil-compression springs 180, 181 are on elongated bolts 182, 183 threaded in the pressure plate. These bolts 182, 183 pass through aligned apertured portions of the carriage plate 125, heater plate 133 and die-retaining plate 135, and the compression springs 180, 181 each have one of their ends bearing against the pressure plate 137 and the other one of their ends bearing against a recessed portion of the heater body 133.

*Film-cutting means*

As previously described, the film channel 20 in FIGURES 16 and 17 is loosely pivotally-supported on the movable film-cutting assembly 17 (FIGURES 16, 17 and 9) and the means whereby such assembly 17 is moved is now described under this heading.

As shown in FIGURE 10, the assembly 17 is slidably mounted on the protruding part (FIGURE 23) of the vacuum block or chuck 33, the vacuum block 33 being secured by bolts to a stationary late 186 backed by brace members 187, 188 which are secured to the stationary carriage guide or ways 121.

The assembly 17 is biased by coil-compression springs 24 on pins 190, 191. These pins 190, 191, as shown in FIGURE 6, each have one of their ends secured in the apertured film guide plate 16 by dowel pins 193 and the other one of their ends slidably mounted within apertured portions 195 of the stationary plate 186; and the springs 24 each have one of their ends bearing against the film plate 16 and the other one of their ends bearing against the stationary plate 186. Means are provided for moving the film plate 16., i.e. assembly 17, against the action of these coil-compression springs 24 to allow a card to be placed in the machine and such means comprise a pair of cam members 25 (FIGURE 11) engaging the rearwardly-extending portions 28 of the film plate 16. These cams 25 are mounted on a shaft 26 journalled for rotation in the spaced bearing supports 200, 201 and carrying a gear (FIGURE 1) meshing with the motor-driven gear 203 meshing with gear 204 on the motor-driven shaft 148. These cams 25 are effective to retract the film plate 16 to allow a card to be placed in the machine. During the operation of the machine, the springs 24 are effective to clamp the inserted card between the film plate 16 and stationary support 15. However, during the tape and film-cutting operations, the die member 31 moves to apply a force to the film plate 16 to cause the same to move against the action of springs 24 and to produce a shearing of the film between adjacent edges of the stationary vacuum chuck 33 and inner edges of the die plate 16, i.e. at the film channels 18 and 35. After the film is cut, it is retained against the chuck 33 by vacuum at ports 33A. For these purposes the vacuum chuck 33 is secured by machine bolts to the stationary supporting plate 186 and vacuum developed by a suitable vacuum pump is present in the communicating vacuum line 205 which is considered to be the source of vacuum.

*Electrical operation*

FIGURE 30 is a schematic illustration showing in greatly simplified form the electrical control system which includes the six cam-operated switches 210, 211, 212, 213, and 214 (FIGURE 1) operated by corresponding cams 216, 217, 218, 219 all on the motor-driven shaft 149, the cam 216 being a double-lobe cam and the other four cams being single-lobe cams.

The system is illustrated for simplicity purposes as being energized from an A.C. source 221 (FIGURE 30) which supplies energy to the system through a main control switch 223. Upon closing of this switch 223, the heaters 132 are energized to bring the machine, i.e. the heater blocks 133 and 133A, up to proper operation temperatures. These heaters 132 in heater blocks 133 and 133A are preferably thermostatically controlled to maintain a constant temperature, using conventional means for that purpose.

Closing of switch 223 results also in connecting one terminal of the main driving motor 153, the slot ejector solenoid 169, the vacuum control valve 236, the tape-feed solenoid 114 and the tape-driving motor 112, the other terminal of each of these elements being selectively connectible to the other terminal of source 221 through cam-operated switches 210, 211, 212, 213 and 214 in a manner presently described. The dotted lines in FIGURE 30 represent cam operation of these switches. A control or start switch 237 is connected in parallel with the cam-operated motor control switch 210; and also the knob-operated switch 67 is also connected in parallel with these switches 210 and 237. The card-operated switch 22 is connected in series with the motor control relay which is represented in FIGURE 30 in the same box as the motor 153, it being understood that when the motor control relay is energized, power is supplied to the motor 153 to cause it to rotate and to operate the cam-operated switches. As previously indicated, the cam for operating the switch 210 is a double-lobe cam for de-energizing the motor twice during one complete revolution of the motor-driven shaft 149, i.e. to de-energize the driving motor 153 after the card-aperturing operation and then again after the bonding tape and film are cut and bonded to the apertured card and the machine returned to its initial condition wherein it is again receptive to another card.

When a card is inserted in the machine, the card closes the switch 222 to condition the motor-energizing circuit which is then completed by manually closing the start switch 237 which is of the momentary type requiring manual effort to maintain the same closed. This switch 237 is maintained closed sufficiently long to allow the first lobe in the motor-driven double cam 216 to close the switch 210 which then serves as a holding switch maintaining the motor 153 energized to perform the card-aperturing operation in which the die 31 (FIGURE 10) moves rearwardly (to the right in FIGURE 10) through a previously cut apertured portion in the tape 12 and thereafter at the end of its stroke moves forwardly through the same apertured portion of the tape, after which the dwell on cam 216 allows the switch 210 to open to automatically de-energize the motor. However, prior to opening of switch 210 and just prior to return movement of the die 31, the cam 217 closes the switch 211 to energize the ejector solenoid to thereby assure movement of the severed part of the card to assure its removal by gravity through the opening 35 (FIGURE 10).

After the machine is thus automatically brought to rest at the completion of the card-aperturing process, the operator feeds a film 11 into the film channels 18 and 35 (FIGURE 10), with a portion thereof now extending into the lower film channel 35, using the knob 42 (FIGURE 1), and when proper registry of the film is accomplished, the knob-operated switch 67 is manually closed to complete an energizing circuit for the motor 153, this switch 67 being also of momentary type and is maintained closed sufficiently long to permit the cam-operated switch 210 to again serve as a holding switch, holding the motor 153 energized until the completion of the next sequence of events involving cutting of the film and the tape, bonding of the tape to the card and film and return of the machine to its initial condition. In this sequence of events, the driving motor 153 advances the assembly 75 (FIGURE 10) through a previously apertured portion of the bonding tape to effect a shearing of the film as previously described. Shortly before the film is cut, the cam-operated switch 212 is operated to energize the vacuum control valve 235 so that the vacuum in the ports 33A of the vacuum chuck 33 holds the cut film against the vacuum chuck; and this switch 212 is automatically opened when the die is withdrawn after the bonding operation. After the film is cut, the driving motor 153 retracts the assembly 75 after which the cam-operated switch 213 is closed by its corresponding cam 218 to energize the tape solenoid 114 to thereby allow the tape to be moved; and shortly thereafter or substantially contemporaneously therewith, the cam-operated switch 214, operated by cam 219, is closed to energize the tape-driving motor. The tape-driving motor 112 runs until the tape is advanced the correct incremental distance established by the solenoid pawl 105 again engaging the ratchet 104 (FIGURE 29) after which the switch 214 is opened to de-energize the tape-driving motor 112. In this condition the tape 12 is then advanced to be cut by the advancing assembly 75 (FIGURE 10). After the tape is cut and advanced against the card and finally the film, the assembly 75 dwells for a predetermined time interval to allow proper bonding, after which the assembly 75 is returned to its initial condition. After the die is returned to its initial condition, the holding switch 210 is automatically opened to again deenergize the motor 153. It is noted also that at this time the motor-driven cam 25 (FIGURE 2) is rotated so that its lobe portion engages the member 30 (FIGURE 2) to move the same to the right to open the card channel to allow withdrawal of the finished card and the insertion of a new card.

In the modification shown in FIGURE 31, an endless belt 250 passing over rollers 251, 252 is used to advance the tape 12 which is clamped between one reach of belt 250 and the spring-biased guide 254. The guide 254 has two rods 255, 256 extending therefrom which pass through apertured portions of corresponding brackets 257, 258 and which mount coil-compression springs 259, 260 between corresponding brackets and the guide 254 to assure a driving connection between the adhesive side of tape 12 and belt 250. The roller 252 is mounted on one end of lever 264 which is pivoted on pin 265, the other end of lever 264 having attached thereto the movable end of a coil-tension spring 266 to cause the belt 250 to be pressed into driving engagement with the motor-driven roller 268 on shaft 100 which is driven by motor 112 through belt 108. A pawl and ratchet is also associated with shaft 100 as previously described.

In the modification shown in FIGURE 32, the ejector plate 263A (corresponding to the pivoted resilient strip 163A of thin sheet stock in FIGURE 10) comprises a heavy bar or slab which is secured on the ejector pin 166 which now passes through the plunger 76. Guide bolts 280 are threaded in ejector plate 263A and have their heads slidably mounted in recessed portions of the plunger 76. A coil-compression spring 284 has its ends recessed in the members 76 and 263A to urge the same apart. This spring 284 is compressed during the card-aperturing process and the energy stored therein together with the impetus supplied to the solenoid-operated pin 166 assures removal of the cut portion of the card. It is preferred that the ejector plate 263A be of heavy construction since it has been found that when using thin sheet material as is illustrated at 163A in FIGURE 10, the same has a tendency, after prolonged use, to lose its resiliency, particularly since the same is subjected to the heat developed in the machine.

The bonding tape used is preferably of the character known in the trade as Mylar which is considered as being Du Pont polyester film coated on one side with polyethylene and which may be purchased from various sources and which is considered to be a thermosetting material coated with a thermoplastic polyethylene material. The photographic film is of conventional type and is considered to be of cellulose acetate. The card itself is also of commercially available stock comprising calendered paper and sometimes referred to as an IBM card. The tape is sufficiently thin so as not to increase the overall thickness of the card to such an extent as to interfere with tolerances of electronic data processing machines.

In the bonding operation it has been observed that the bonding tape in the production of its function is more dependent on temperature than on pressure in that only a relatively slight amount of pressure just sufficient to produce contact between the bonding tape, on the one hand, and the card and film, on the other hand, is required while the tape is in a heated condition. The pressure should be sufficient to assure against the development of air pockets, bubbles or fogging in the thermal bond. The heating blocks in the machine may be maintained at a constant temperature of 250° Fahrenheit although it is estimated that in operation of the machine the actual bonding occurs at a temperature of approximately 225° to 235° Fahrenheit.

*Operation*

The operation of the machine may be described briefly as follows. First, the machine is energized for a sufficient length of time to allow the parts to reach operating temerature. In the initial at rest condition of the machine, the card channel or holder 14 is completely opened, i.e. the film guide plate 16 is withdrawn to the right in FIGURE 11 by the cam 25 so as to allow insertion of the card 10 between the stationary clamping member 15 and movable film plate 16; and when the card 10 is inserted, it operates the switch 22 (FIGURE 6) which serves to condition an energizing circuit (FIGURE 30) for the main driving motor 153, this circuit then being completely closed by manual operation of the start switch to set the machine in operation for aperturing the card. When the machine is thus set in operation, the motor-driven die member 31 (FIGURE 4) advances and reaches the condition shown in FIGURE 4 wherein a rectangular portion 10B of the card is severed between the inner edge of die member 31 and the adjacent marginal edge of the stationary suction chuck 33 (suction, however, not being applied at this time). In such advancement of die member 31, it is noted that the tape 12 remains stationary and that the die member 31 passes through a previously rectangularly-shaped cut-out portion of the tape 12. After the card-shearing operation, the die member 31 is returned to the left in FIGURE 4 and during its initial return movement the solenoid-operated pin 166 (either FIGURE 4 or FIGURE 32) is actuated to assure removal of the non-useful card cut-out portion 10B by gravity through the opening 35. During such return movement of the die 31, the apertured card 10 remains in a clamped condition, first between the die member 31 and film plate 16 and subsequently between the film plate 16 and stationary clamping member 15, and when the die member 31 reaches a partially retracted position, the main driving motor 153 is automatically de-energized by the cam-operated switch 210 which prior thereto served as a holding switch. Subsequent operation of the machine is later effected by manual operation of the knob-operated switch 67. Operation of switch 67 is accomplished automatically when the operator using knob 42 (FIGURE 1) in his feeding of the film 11 through the film channel 13 and into the lower aligned film channel 35 accomplishes proper registry of the film portion 11A with the card apertured portion 10A as observed in the viewing window 70 (FIGURE 13).

When switch 67 is thus closed, the motor-driven die member 31 is again advanced to produce a shearing of the film 11 between the die plate 16 and the vacuum chuck 33 which now has vacuum applied thereto to hold the cut film portion 11A against the face of the stationary chuck 33. After the film is cut, the die member 31 is returned to allow the tape to be fed in a position for shearing of tape 12 between the outside marginal edge of die 31 and the adjacent marginal edge of the stationary clamping member 15; and after the useful portion 12A is thus sheared, it is moved by the die member 31 into contact with the marginal portions of the apertured portion of card 10 and cut film. When the tape cut portion 12A contacts the film, the die member 31 is brought to rest, there being sufficient dwell in the motor-driven cam 144 which serves to drive the die member 31 for this purpose. During this at rest condition, heat is being supplied to the tape, card and film to achieve a bonding of these three component parts, the bonding tape having its full area adjacent the card and film bonded to the card and film.

After this bonding is achieved, the cam 144, continuing to rotate, retracts the die member 31 and the cam-operated switch 210 (FIGURE 30) again opens to de-energize the main driving motor. However, just prior to full retraction of the die member 31, the motor-driven cam 25 (FIGURE 11) moves the film plate 16 out of clamping engagement with the completed card 10 to allow its withdrawal from the holder and to permit insertion of the next card for the next cycle of operations.

While the particular embodiments of the present invention have been shown and described, it will be obvious to those skilled in the art that changes and modifications may be made without departing from this invention in its broader aspects and, therefore, the aim in the appended claims is to cover all such changes and modification as fall within the true spirit and scope of this invention.

We claim:

1. In a unitizing machine of the character described comprising, a stationary support, a member slidably mounted on said support, a cutting die member mounted on said member and having inner and outer peripheral cutting edges, a stationary vacuum chuck on said support, said chuck having an outer peripheral cutting edge, a film guide slidably mounted on said chuck and having an inner peripheral surface cooperating with said cutting edge on said chuck for shearing film therebetween, said film guide having aligned apertured portions through which a film extends, spring means acting between said film guide and said chuck to normally allow film to be threaded through said aligned apertured portions, a stationary die member mounted on said support and having an inner peripheral edge cooperating with the outer peripheral edge of the first-mentioned die member to shear tape therebetween, said stationary die member having a surface adjacent said film guide, said spring means biasing said film guide towards said stationary die member to clamp a card between said stationary die member and said film guide, a movable pressure plate carried by the first-mentioned member, second spring means acting between said pressure plate and said first-mentioned member, said pressure plate having a surface adjacent said stationary die member, tape feed means for feeding tape between said pressure plate and said adjacent surface of said stationary die member, the inner peripheral edge of the first-mentioned die member cooperating with said cutting edge on said chuck to shear an apertured portion in a card therebetween, and means for moving the first-mentioned die member on said support.

2. In a unitizing machine of the character described comprising, a stationary support, a stationary vacuum chuck on said support for holding a section of sheared film, a film guide movably mounted on said support, said film guide having aligned apertured portions through which a film may be threaded, said film guide comprising an inner edge which cooperates with an adjacent edge of said vacuum chuck to shear film therebetween to produce a section of sheared film which is held by said vacuum chuck, means normally biasing said film guide away from said chuck to allow film to be threaded through said aligned apertured portions, and means moving said film guide against the action of said biasing means to produce a shearing between the aforementioned edges.

3. In a unitizing machine of the character described comprising, a support, a vacuum chuck mounted on said support for holding a cut section of film and having an outer generally rectangular-shaped cutting edge, a film guide movably mounted with respect to said chuck including means for guiding film to said chuck, a generally rectangular stationary card-clamping member, said film guide being positioned between said clamping member and said chuck, spring means acting between said chuck and said film guide for pressing said film guide against said clamping member to clamp a card between said film guide and said clamping member, a die member having an inner peripheral edge and slidably mounted on said support, and means for moving said die member into engagement with a card clamped between said clamping member and said film guide and for moving said film guide and said car against said spring means to produce a shearing of the card between said inner peripheral edge of said die member and said chuck.

4. In a unitizing machine of the character described comprising, a support, a vacuum chuck carried on said support for holding a section of sheared film and having an outer peripheral cutting edge, a film guide slidably mounted on said chuck and having an inner peripheral cutting edge cooperating with said edge of said chuck to produce a shearing of the film therebetween, said film guide having aligned apertured portions through which a film may be threaded, means threading a film through said aligned apertured portions, spring means urging said film guide away from said vacuum chuck and means moving said film guide against the action of said spring means to produce a shearing of the film between said cooperating cutting edges to produce a sheared section of film which is held by said vacuum chuck.

5. In a unitizing machine of the character described comprising, a support, a stationary card-clamping member carried on said support and having a generally rectangular opening therethrough, a stationary card-cutting die member on said support, a film guide slidably mounted on said stationary die member, means acting between said stationary die member and said film guide for biasing said film guide away from said stationary cutting die, and for pressing said film guide towards said stationary clamping member to clamp a card therebetween, a movable die member, movably mounted on said support and having an inner peripheral cutting edge cooperating with the cutting edge on the stationary die to produce a shearing action on a card therebetween, and means for moving said movable die member in engagement with said card and for overcoming the biasing action of said biasing means to move said card towards said stationary die member to effect said shearing action between said movable and stationary die members.

6. In a unitizing machine of the character described comprising, a support, an assembly slidably mounted on said support, said assembly including a die member which is generally rectangular and which has an inner and an outer peripheral cutting edge separated by a substantially flat portion, said assembly carrying a pressure plate which is movable on said assembly, first spring means acting between said pressure plate and a portion of said assembly, said pressure plate surrounding said die member, a stationary clamping member on said support and having a surface adjacent to a surface of said pressure plate for clamping tape therebetween, said clamping member being open to allow said movable die member to pass therethrough and having an inner peripheral cutting edge cooperating with the outer peripheral edge of said die member to shear tape therebetween, a vacuum chuck forming also a die member, said chuck being stationarily mounted on said support, a film guide positioned between said stationary clamping member and said chuck and being movably mounted on said chuck, said film guide and clamping member having adjacent surfaces between which a card is clamped, second biasing means acting between said chuck and said film guide urging said film guide towards said stationary clamping member, said film guide and said chuck having cooperating shearing edges for shearing film therebetween, said edge on said chuck cooperating also with the inner edge of said movable die member to shear a card therebetween, said flat surface on said movable die member being engageable with a portion of the card clamped between said film guide and said stationary clamping member, and means for moving said assembly with respect to said chuck.

7. In a unitizing machine of the character described comprising, a support, an assembly slidably mounted on said support, said assembly including a generally rectangular open die member having inner and outer peripheral cutting edges separated by a flat card-engaging portion, a stationary clamping member having an opening therethrough through which said die member passes, a stationary card-cutting die member, a movable film guide positioned between said stationary die member and said clamping member, means biasing said film guide towards said clamping member to clamp a card between said clamping member and said film guide, and means for moving said assembly to produce engagement between said flat surface and a portion of a card adjacent said film guide to move said card and film guide towards said stationary die member to produce a shearing of the card therebetween.

8. In a unitizing machine of the character described comprising, a support, a stationary die member on said support, a film guide slidably mounted on said die member and having an inner peripheral edge cooperating with an outer peripheral edge of said die member to produce a film shearing action therebetween, a combination clamping and die member stationarily mounted on said support and having a surface adjacent a surface of said film guide for clamping a card therebetween, means biasing said film guide towards said clamping member, a movable die member movable through said combination clamping and die member and having an outer peripheral edge cooperating with the inner peripheral edge of said combination clamping and die member for shearing tape therebetween, and said movable die member having an inner peripheral edge cooperating with the outer peripheral edge of the first-mentioned die member to produce a shearing action of a card therebetween.

9. In a unitizing machine of the character described comprising, a support, a combination clamping member and die member on said support and having an opening therethrough, a stationary die member, a movable film guide between said combination clamping and die member and the last-mentioned die member, said film guide being slidably mounted on said last-mentioned die member, spring means acting between said film guide and said last-mentioned die member for clamping a card between said film guide and said combination clamping and die member, and a movable die member movable through said combination clamping member and die member to engage a card clamped between said combination clamping and die member and said film guide and for moving the same towards said last-mentioned die member to produce a card-shearing action between the same and means for moving said movable die member.

10. In a unitizing machine of the character described comprising, a card pocket, means forming a portion of said card pocket for clamping said card, a stationary die, a movable die engaging a portion of said card clamped by said means and moving said card and a part of said means into engagement with said stationary die to produce a shearing action between said movable and stationary dies.

11. In a unitizing machine of the character described comprising, a stationary die member defined by generally a rectangular outer cutting edge, a second stationary die spaced from the first-mentioned die and having a central apertured portion of larger dimensions than the first-mentioned die, a movable film guide between the first and second-mentioned stationary dies, said film guide being suitably mounted on the first-mentioned die and having an inner peripheral cutting edge cooperating with the cutting edge of the first-mentioned die, means biasing said film guide agianst said second die, said second die and said film guide having adjacent surfaces between which a card is clamped by said biasing means, the inner dimensions of said film guide being smaller than the inner dimensions of said second die, a movable die having an internal apertured portion defining an internal cutting edge, said movable die having an external cutting edge cooperating with the internal cutting edge of the second stationary die, said first die, second die and movable die and film guide being coaxially mounted.

12. In a unitizing machine of the character described comprising: a stationary die, a movable die movable telescopically over said stationary die so as to obtain a shearing action between cooperating edges of the same, a combination stationary die and clamping member positioned between said movable and stationary dies and through which said movable die may pass, said movable die having an external cutting edge cooperating with an internal edge of said combination clamping and die member, said combination clamping and die member having two surfaces, one of which serves as a clamping surface for tape and the other surface serves as a clamping surface for a card, a film guide slidably mounted on said stationary die, means biasing said film guide towards said other surface of said clamping member, and a pressure plate spring-biased on said movable die and disposed adjacent said one surface of said clamping member for clamping tape therebetween.

13. In a unitizing machine of the character described comprising, a card receptacle receptive to a card, a stationary die and a movable die spaced from said card in said receptacle on opposite sides of said card, means effective upon movement of said movable die for moving said card adjacent said stationary die and for achieving a shearing action between said movable and stationary dies, film-guiding means between said stationary die and said card for guiding a film therebetween, said film-guiding means comprising a die member cooperating with said stationary die for shearing film between the same, tape-guiding means between said movable die and said card, said tape-guiding means comprising a die member which cooperates with said movable die to shear tape therebetween and means for moving said movable die.

14. In a unitizing machine of the character described comprising, step-by-step tape-feeding means, means including two cooperating shear elements for cutting a rectangular portion out of said tape to provide a rectangular apertured portion in said tape, card-aperturing means, said card-aperturing means including one of said shear elements movable through the apertured portion of the tape, and means for operating said step-by-step tape-feeding means after operation of said card-aperturing means to position said tape in the path of movement of said one shear element.

15. In a unitizing machine of the character described comprising, a card holder, said card holder comprising a stationary apertured clamping plate, said card holder comprising also a film guide, and means biasing said film guide towards said clamping plate to clamp a card between said clamping plate and said film guide card aperturing means including two cooperating shear elements one of which is movable through said apertured clamp plate and the other one of which cooperates with said film guide to shear film.

16. In a unitizing machine of the character described comprising, a stationary apertured card clamping plate, a die member movable through said apertured clamping plate, said die having an outer edge cooperating with the internal peripheral edge of said clamping plate for shearing a section of tape therebetween, card aperturing means including an inner edge of said die for cutting out a portion of a card and a pressure plate movably mounted on said die for assuring removal of said portion and for pressing said section against said card.

17. In a unitizing machine of the character described comprising, a support, an assembly slidably mounted on said support, said assembly comprising a die, said assembly comprising an elongated base plate slidably mounted in said support, a shaft on and extending transversely of said elongated plate, a pair of motor-driven cams on opposite sides of and engageable with said shaft for moving said assembly in opposite directions, said cams comprising one-revolution cams, means including said die effective during one-half revolution of said cams for aperturing a card, and means including said die effective during the succeeding half-revolution of said cams for cutting film and bonding tape and for bonding of said tape to said card and to said film, said aperturing means and film cutting and bonding tape means each being operatively connected and controlled by said motor driven cams.

18. In a unitizing machine of the character described comprising a support, a base plate slidably mounted on said support, said base plate carrying a shaft on and extending transversely theerof, a pair of one-revolution cams on opposite sides of and engageable with said shaft for reciprocating said base plate, said base plate carrying a die member, card-aperturing means including said die member operated during a portion of one revolution of said cam means, film-cutting means and tape-cutting means operated by said cams in that order upon successive revolution of said cam means during the other portion of revolution of said cam means, said cam means being effective to move the cut tape adjacent the apertured card and the cut film to produce a bonding of the tape to said card and said film, said cam means having dwell therein to allow prolonged contact between said cut tape, card and film to achieve proper bonding between the same.

References Cited by the Examiner

UNITED STATES PATENTS

| | | | |
|---|---|---|---|
| 2,129,686 | 9/38 | Gray | 154—118 |
| 2,588,087 | 3/52 | Connor et al. | 156—514 |
| 2,633,655 | 4/53 | Langan | 154—118 |
| 2,643,786 | 6/53 | Baker | 156—514 |
| 2,666,543 | 1/54 | Standish | 156—514 |
| 2,704,566 | 3/55 | Thompson et al. | 154—1.6 |
| 2,819,656 | 1/58 | Patterson | 154—118 |
| 2,889,066 | 6/59 | Alberty | 154—118 |

EARL M. BERGERT, *Primary Examiner.*

CARL F. KRAFFT, *Examiner.*